(12) United States Patent
Liu

(10) Patent No.: US 6,237,801 B1
(45) Date of Patent: May 29, 2001

(54) DOUBLE-WALLED MUG WITH HANDLE

(75) Inventor: Ching Liu, Lake Oswego, OR (US)

(73) Assignee: Pacific Cornetta, Inc., Wilsonville, OR (US)

( * ) Notice: Subject to any disclaimer, the term of this patent is extended or adjusted under 35 U.S.C. 154(b) by 0 days.

(21) Appl. No.: 09/542,152

(22) Filed: Apr. 4, 2000

(51) Int. Cl.⁷ ....................................................... B65D 7/44

(52) U.S. Cl. ...................... 220/592.17; 220/759; 220/769

(58) Field of Search ................................... 220/759, 769, 220/752, 592.17, 592.27, 592.28

(56) References Cited

U.S. PATENT DOCUMENTS

| | | | | |
|---|---|---|---|---|
| 901,400 | * | 10/1908 | Vincent | 220/752 |
| 2,905,500 | * | 9/1959 | Thombs | 220/769 |
| 4,206,852 | * | 6/1980 | Iten et al. | 220/769 |
| 4,220,254 | * | 9/1980 | Morton | 220/769 |
| 5,025,939 | * | 6/1991 | Bunn et al. | 220/752 |
| 5,560,506 | * | 10/1996 | Yanagisawa et al. | 220/752 |
| 5,752,618 | * | 5/1998 | Tebitz et al. | 220/769 |

* cited by examiner

Primary Examiner—Joseph M. Moy
(74) Attorney, Agent, or Firm—Chernoff, Vilhauer, McClung & Stenzel

(57) ABSTRACT

A double-walled beverage container assembly comprising an outer shell and a handle and an inner cup assembled in a tight-fitting compression fit.

6 Claims, 2 Drawing Sheets

DOUBLE-WALLED MUG WITH HANDLE

BACKGROUND OF THE INVENTION

The present invention relates to a drinking container used for holding, dispensing and consuming beverages. In particular the invention relates to a double-walled mug with a secure handle.

Double-walled mugs are well known for holding and the consumption of hot and cold beverages. The doubled-walled construction provides thermal insulation. Such mugs have been constructed to include a handle that is attached to the body of the container. Mugs with such handles are usually constructed in one of two methods: casting the handle and body as an integral item or producing the handle and body as two separate items and then joining them by welding, by adhesives, or by threaded fasteners. Both these methods, however, have drawbacks.

Integral handle/body mugs produced by casting result in a strong connection between the body and the handle. However, such mugs are expensive to produce, require expensive tooling which often has a short tooling life, and require relatively long production cycles. Moreover, these mugs are aesthetically limited in the sense that, since the body and handle must be made of the same material, they must also be of the same color. In addition, integral casting causes an unattractive mold separation line running along both the handle and the body.

Producing the handle and the mug body separately and then securing the components together using welds, adhesives or fasteners avoids some of the aesthetic disadvantages of the integral casting method. However, such mugs are also expensive to produce since construction involves many additional steps. Moreover, the connection between the handle and the body is inherently insecure as handles which are attached with screws or adhesives will loosen over time due to the torque they are subjected to from daily use.

Accordingly, what is needed is a double-walled beverage mug that can be constructed from separate components and wherein the handle is not molded or cast as part of the body, or glued, fastened or welded to the body.

SUMMARY OF THE INVENTION

The present invention is directed to a mug comprising a hollow outer shell having a rim with portions providing a notch, a handle which comprises a hand grip portion and a notch-engaging portion adapted to engage the rim at the notch, and an inner cup with a flange that is adapted to engage the rim of the outer shell and restrain the notch-engaging portion of the handle in the notch when the inner cup is inserted into the hollow outer shell.

The handle and body of the mug of the present invention can be manufactured separately and joined together without the use of welds or adhesives, or multiple fasteners. The outer shell and handle are assembled so that the handle engages the outer shell and the insertion of the inner cup restrains and unifies the entire assembly. This assembly has distinct advantages over the prior art mugs discussed above: simple and inexpensive tooling is required to manufacture the component parts and multiple cavity tooling can be used, thereby reducing production run times. Furthermore, the present invention avoids the aesthetic drawbacks encountered in prior art mugs. Because the handle and body are produced separately, simple molds can be used, thereby eliminating the mold parting lines running along both the handle and the body. Moreover, the handle and body may be made of different materials, be of different colors, or have different finishes.

DETAILED DESCRIPTION OF PREFERRED EMBODIMENT

Figures 1, 2:
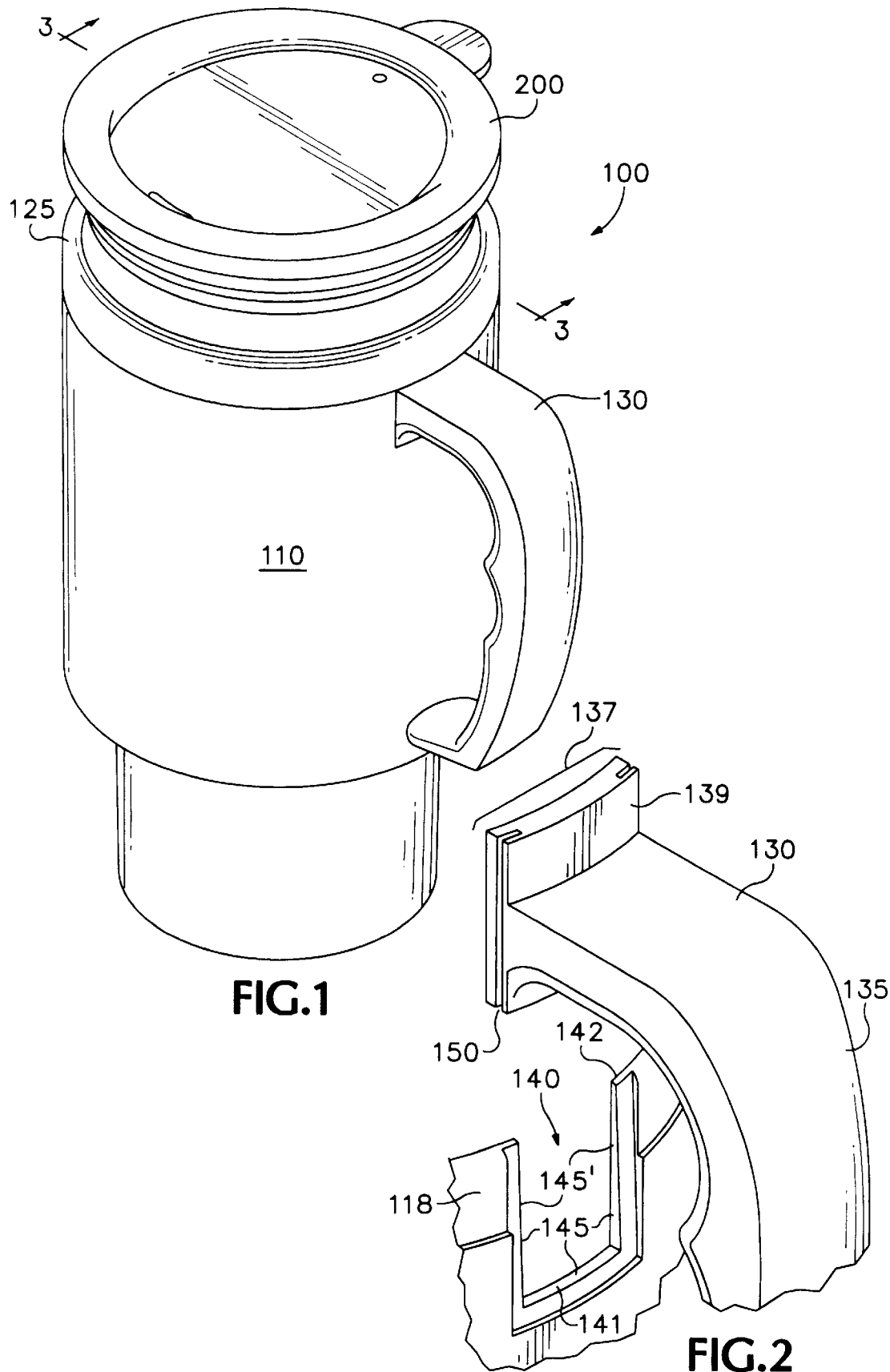
FIG. 1 is a perspective view of an exemplary embodiment of the invention.
FIG. 2 is a partial exploded view of an exemplary embodiment of the invention.

Referring to the drawings, wherein like numerals refer to the same elements, there is shown in FIG. 1 a double-walled beverage container 100 comprising an outer shell 110, an inner cup 120 with a flange 125, a handle 130 and an optional lid 200. In FIG. 2, handle 130 comprises a hand grip portion 135 and a notch-engaging portion 139. Notch-engaging portion 139 engages with outer shell notch 140, forming a connection between the handle and outer shell.

Figure 3:
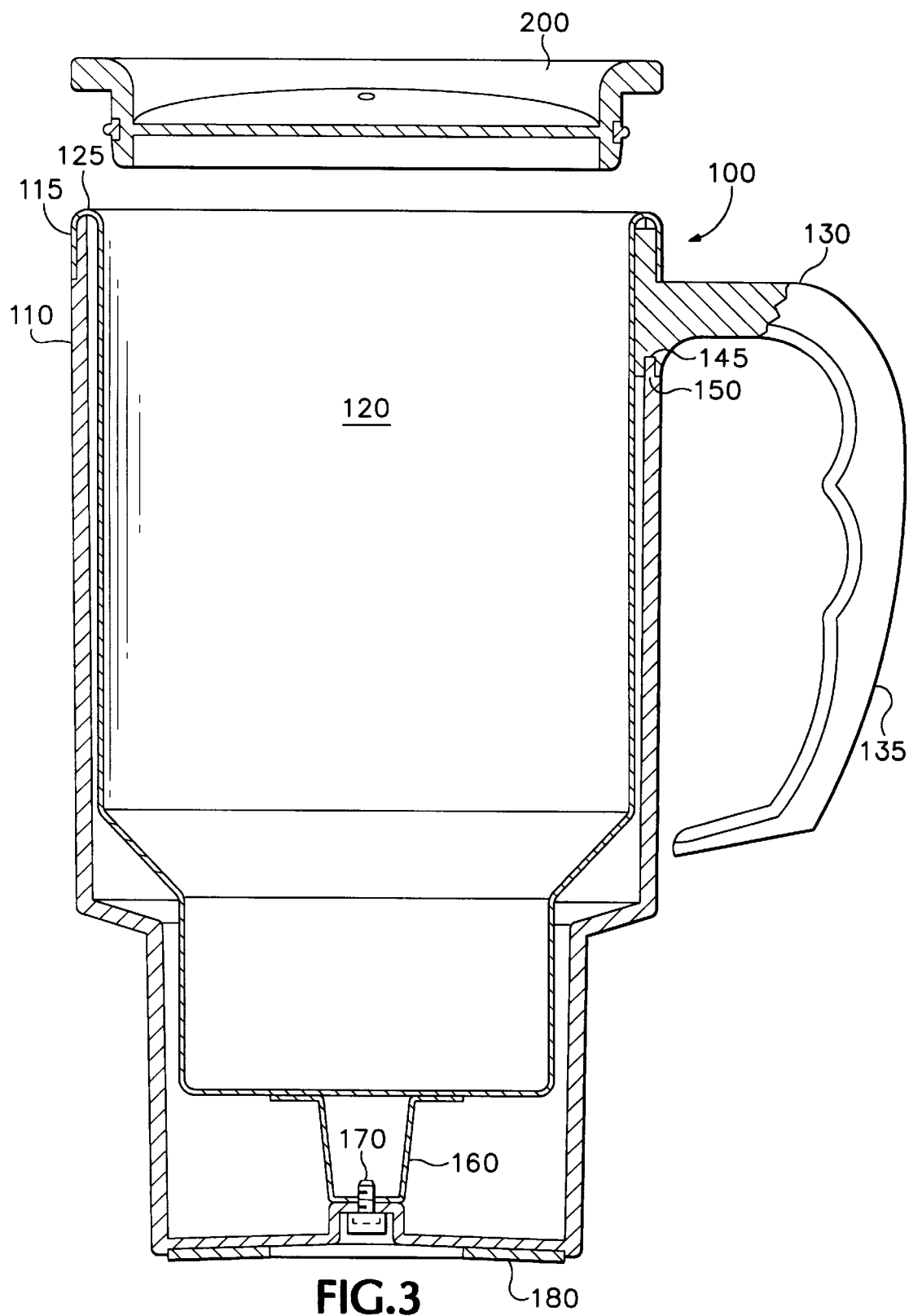
FIG. 3 is is a sectional view taken through plane 3—3 of FIG.1.

Referring to FIGS. 2 and 3, the connection between notch-engaging portion 139 and outer shell notch 140 is accomplished by a slidingly mating engagement between, on the one hand, notch flange 145, and on the other hand, peripheral groove 150. Notch flange 145 is tapered on its side portions 145' from its base 141 toward its upper portion 142. The taper of notch flange 145 causes a compressive effect, tightly wedging notch flange 145 into peripheral groove 150, and so creating a secure attachment of handle 130 to outer shell 110.

Referring again to FIGS. 2 and 3, inner cup 120 includes a flange 125 that fits over upper rim 115 and annular recess 118 of outer shell 110. Annular recess 118 is sized so that when inner cup 120 is inserted into outer shell 110, flange 125 snugly engages both annular recess 118 and the top portion 137 of notch-engaging portion 139 of handle 130, creating a tight compression fit between inner cup 120, outer shell 110 and handle 130, all without gluing, welding or screws.

Inner cup 120 is preferably anchored to outer shell 110 at its base by means of a threaded anchoring bracket 160 secured to the bottom of inner cup 120, and a threaded fastener such as a screw 170 through the base of outer shell 110. The bottom of outer shell 110 may optionally be covered with an elastomeric material 180 to provide a non-slip surface.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A beverage container comprising:
   (a) a cylindrical outer shell open at its upper end so as to form a rim, said rim having a notch;
   (b) a handle comprising a hand grip portion and a notch-engaging portion adapted to engage said rim at said notch; and
   (c) an inner cup insertable into said outer shell and including an upper rim and a peripheral flange on said upper rim adapted to compressively engage said rim of said outer shell and said notch-engaging portion of said handle.

2. The beverage container of claim 1 wherein said notch of said outer shell is thicker at its base than at said rim.

3. The beverage container of claim 2 wherein said notch-engaging portion of said handle includes a peripheral groove engagable with said notch of said outer shell such that, upon engagement, said notch-engaging portion becomes tightly wedged into said notch.

4. The beverage container of claim 3 wherein said notch-engaging portion of said handle is made of a resilient material.

5. The beverage container of claim 4, including an anchoring bracket attached to the bottom of said inner cup and a threaded fastener engagable with said bracket.

6. The beverage container of claim 5 including a lid that fits over the top of said inner cup.

\* \* \* \* \*